(12) United States Patent
Reuter et al.

(10) Patent No.: US 7,951,901 B2
(45) Date of Patent: May 31, 2011

(54) PROCESS FOR THE PRODUCTION OF POLYETHYLENE DIOXYTHIOPHENES

(75) Inventors: Knud Reuter, Krefeld (DE); Stephan Kirchmeyer, Leverkusen (DE); Friedrich Jonas, Aachen (DE)

(73) Assignee: H. C. Starck GmbH, Goslar (DE)

( * ) Notice: Subject to any disclaimer, the term of this patent is extended or adjusted under 35 U.S.C. 154(b) by 587 days.

(21) Appl. No.: 11/477,873

(22) Filed: Jun. 29, 2006

(65) Prior Publication Data

US 2007/0010653 A1    Jan. 11, 2007

(30) Foreign Application Priority Data

Jul. 5, 2005  (DE) .................... 10 2005 031 349

(51) Int. Cl.
*C08G 75/00* (2006.01)

(52) U.S. Cl. .................. 528/380; 528/373; 528/377

(58) Field of Classification Search .............. 528/373
See application file for complete search history.

(56) References Cited

U.S. PATENT DOCUMENTS

| | | | |
|---|---|---|---|
| 4,959,430 A * | 9/1990 | Jonas et al. | 526/257 |
| 4,987,042 A | 1/1991 | Jonas et al. | |
| 5,035,926 A | 7/1991 | Jonas et al. | |
| 5,300,575 A * | 4/1994 | Jonas et al. | 525/186 |
| 6,891,016 B2 | 5/2005 | Reuter et al. | |
| 2004/0171790 A1 * | 9/2004 | Baik et al. | 528/378 |

FOREIGN PATENT DOCUMENTS

| | | |
|---|---|---|
| EP | 0 339 340 | 11/1989 |
| EP | 0 440 957 | 8/1991 |
| EP | 1 375 560 | 1/2004 |

OTHER PUBLICATIONS

Yamamoto et al. (Synthetic Metals, 100: 237-239, 1999).*
Groenendaal et al., "Poly(3,4-ethylenedioxythiophene) and Its Derivatives: Past, Present, and Future", Advanced Materials, vol. 12, No. 7, pp. 481-494, 2000.
Meng et al., "Facile Solid-State Synthesis of Highly Conducting Poly(ethylenedioxythiophene)", Angew.Chem. Int. Ed., vol. 42, No. 6, pp. 658-661, 2003.
Meng et al., "Facile Solid-State Synthesis of Highly Conducting Poly(ethylenedioxythiophene)", Angew. Checm., vol. 115, No. 6, pp. 682-685, 2003.
Meng, et al., "Solid-State Synthesis of a Conducting Polythiophene via an Unprecedented Heterocyclic Coupling Reaction," *J. Am. Chem. Soc.*, (2003), vol. 125, pp. 15151-15162.

* cited by examiner

*Primary Examiner* — Randy Gulakowski
*Assistant Examiner* — Shane Fang
(74) *Attorney, Agent, or Firm* — Conolly Bove Lodge & Hutz LLP

(57) ABSTRACT

The production of electrically conductive polythiophenes by reaction of 2,5-dihalogen-3,4-ethylene dioxythiophenes with 3,4-ethylene dioxythiophenes in a solvent or liquid phase is provided. These polythiophenes can be used as a plastic or lacquer additive to provide antistatic properties.

13 Claims, No Drawings

PROCESS FOR THE PRODUCTION OF POLYETHYLENE DIOXYTHIOPHENES

CROSS-REFERENCE TO RELATED APPLICATION

This application claims priority under 35 U.S.C. §119 (a-e) to German application DE 10 2005 031349, filed Jul. 5, 2005.

FIELD OF THE INVENTION

The present invention relates to the production of special electrically conductive polythiophenes by reaction of 2,5-dihalogen-3,4-ethylene dioxythiophenes with 3,4-ethylene dioxythiophenes and their use as an additive for plastics or lacquers.

BACKGROUND OF THE INVENTION

The compound class of the π-conjugated polymers has been the subject of many publications in the past few decades. They are also called conductive polymers or synthetic metals.

Conductive polymers are increasing in economic importance, as polymers have advantages over metals with regard to processability, weight and the targeted setting of properties by chemical modification. Examples of known π-conjugated polymers are polypyrrols, polythiophenes, polyanilines, polyacetylenes, polyphenylenes and poly(p-phenylene-vinylenes).

A particularly important polythiophene used industrially is poly-3,4-(ethylene-1,2-dioxy)thiophene, often also called poly(3,4-ethylene dioxythiophene), which has very high conductivity in its oxidised state and is disclosed for example in EP-A 339 340 or EP-A 440 957. A summary of numerous poly(alkylene dioxythiophene) derivatives, in particular poly-(3,4-ethylene dioxythiophene) derivatives, their momomer structural elements, syntheses and applications is given in L. Groenendaal, F. Jonas, D. Freitag, H. Pielartzik & J. R. Reynolds, Adv. Mater. 2000, 12, p. 481-494.

The production of highly-conductive poly(3,4-ethylene dioxythiophene) derivatives from 2,5-dihalogen-3,4-ethylene dioxythiophenes has been disclosed only recently. According to the method disclosed by Wudl et al. the 2,5-dihalogen-3,4-ethylene dioxythiophenes are converted in a solid phase reaction to the halogen-doped polythiophenes (H. Meng, D. F. Perepichka and F. Wudl, Angew. Chem. 2003, 115(6), p. 682-685 and H. Meng, D. F. Perepichka, M. Bendikov, F. Wudl, G. Z. Pan, W. Yu, W. Dong and S. Brown, J. Am. Chem. Soc. 2003, 125, p. 15151-15162). Although this process produces the desired highly-conductive polymers, it does have some disadvantages. On the one hand, the solid phase synthesis produces products the conductivity of which is difficult to set and which are highly-dependent on reaction conditions (time, temperature). The maximum conductivity is achieved only after a lengthy reaction time (Angew. Chem.). Furthermore (J. Am. Chem. Soc.) the doped polythiophenes are not temperature-stable and give off highly-toxic halogen e.g. Br at just above room temperature. This behaviour is not compatible with an industrial application. By subsequently treating the 2,5-dibromo-3,4-ethylene dioxythiophene with concentrated strong acids (sulfuric acid, trifluoromethane-sulfonic acid) a material with highly-reduced conductivity is obtained with the release of bromine (J. Am. Chem. Soc.). Neither this subsequent treatment nor the reduction in conductivity is acceptable in the context of an application. The reaction mechanism given in J. Am. Chem. Soc. is oxidative polymerisation of 2,5-dihalogen-3,4-ethylene dioxythiophenes.

According to a method disclosed by Baik et al., the 2,5-dihalogen-3,4-ethylene dioxythiophenes are reacted in solution with acids to produce conductive poly-(2,5-dihalogen-3,4-ethylene dioxythiophene)s (W.-P. Baik, Y.-S. Kim, J.-H. Park and S.-G. Jung, Myongji Univ. Seoul, US Patent Appl. 2004/0171790). However, this process does not succeed in overcoming the fundamental problem of a very high halogen excess remaining in the conductive polymer, e.g. as a $Br_3^-$-counterion which is associated with the disadvantages described above of stability and the risk of the splitting-off of free halogen.

However, the good conductivity of the poly(3,4-ethylene dioxythiophene)s produced from 2,5-dihalogen-3,4-ethylene dioxythiophene that can be achieved by both processes and the advantageous omission of additional oxidising agents characteristic of both processes, make it desirable to seek alternatives. These alternatives should deliver highly-conductive materials using 2,5-dihalogen-3,4-ethylene dioxythiophenes, without the encumbrance of the abovementioned disadvantages.

SUMMARY OF THE INVENTION

Surprisingly it was found, that 3,4-ethylene dioxythiophene (hereinafter abbreviated where necessary to EDT) can be copolymerised extremely well with 2,5-dihalogen-3,4-ethylene dioxythiophenes in the liquid phase or in solution.

This is unexpected for various reasons: according to the process of Baik et al., polymerisation takes place in the presence of protonic or Lewis acids. However, such acids normally convert 3,4-ethylene dioxythiophenes to non-conductive dimers and trimers in an equilibrium reaction (K. Reuter, V. A. Nikanorov, V. M. Bazhenov, EP 1 375 560 A 1). Furthermore, 3,4-ethylene dioxythiophenes always require an oxidising agent in order to be converted to conductive polythiophenes (see Adv. Mater.).

Finally, according to J. Am. Chem. Soc., polymerisation of dihalogen-3,4-ethylene dioxythiophenes in solution does not take place at all. According to Wudl. et al., it is practically bound to the presence of the solid state, as e.g. molten 2,5-dibromo-EDT also polymerises only extremely slowly.

The invention provides a process for the production of electrically conductive poly-3,4-ethylene dioxythiophenes, characterised in that 2,5-dihalogen-3,4-ethylene dioxythiophenes of the Formula (1)

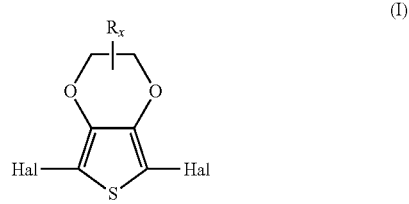

(I)

wherein Hal means Cl, Br or I, R=$C_1$- to $C_{18}$-alkyl optionally substituted with OH or $O(CH_2)_nSO_3M$, where n=3 or 4, M=H or Na, K, and x=0 to 4, and 3,4-ethylene dioxythiophene of the Formula (II)

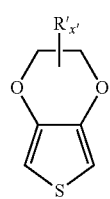

(II)

wherein R' and x' have the same meaning as R and x in formula (I), but can be selected independently of each other, are reacted with one another in a solvent.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Preferably 1 to 99 wt. %, particularly preferably 5 to 95 wt. % of compound (I) is reacted with 99 to 1 wt. %, particularly preferably 95 to 5 wt. % EDT, most particularly preferably 10 to 50 wt. % of compound (I) is reacted with 90 to 50 wt. % of compound (II).

Hal preferably means Br. A compound unsubstituted on the dioxane ring, is preferably used as compound (I), i.e., x is preferably 0, and independently of this x' in compound (II) is preferably also equal to 0.

The reaction necessarily takes place in the liquid phase, i.e. in an organic solvent or in the presence of a quantity of a liquid compound (II), which leads to the dissolution of the solid compound (I) before or during the reaction.

Solvents may be e.g. aliphatic and aromatic hydrocarbons, such as hexane, heptane, octane, toluene, xylene, halogenated aliphatic or aromatic hydrocarbons, such as methylene chloride, chloroform, chlorobenzene, o-dichlorobenzene, ethers, such as diethylether, di-isopropylether, tert.butylmethylether, tetrahydrofuran (THF), dioxane, diglymes, alcohols, such as methanol, ethanol, n- and iso-propanol, butanols, ethylene glycol, diethylene glycol, sulfoxides, such as dimethylsulfoxide (DMSO), amides, such as dimethylformamide, dimethylacetamide, N-methylpyrrolidone. Hydrocarbons and halogenated hydrocarbons are preferred, the latter being particularly preferred. The solvents can also be used as mixtures of various of the examples given above. In some cases, for example where compounds I and/or II are water-soluble, it may be useful also to work in water, optionally in mixture with suitable water-miscible organic solvents.

When using organic solvents it can be advantageous to add catalytic quantities of N-bromosuccinimide. The reaction can take place without or in the presence of acids. The reaction is preferably carried out with acid catalysis. Suitable acids are non-oxidising Lewis acids, such as boron trifluoride (e.g. as a diethylether complex), aluminium chloride, zinc chloride, titanium tetrachloride etc. Suitable acids are also protonic acids such as sulfuric acid, sulfonic acids such as methane sulfonic acid, trifluoromethane sulfonic acid, p-toluene sulfonic acid, polymeric sulfonic acids such as polystyrene sulfonic acid or other strong acids such as e.g. trifluoroacetic acid, phosphoric acid, polyphosphoric acid, hydrochloric acid, hydrobromic acid. Various acids in mixture may also be used.

The reaction can be carried out for example at temperatures of 0 to 180° C., preferably 20 to 120° C., particularly preferably 50 to 100° C.

The conductive polymer powders according to the invention can be used as additives to give antistatic properties to plastics or to produce conductive plastics. Suitable plastics are e.g. polyester, polycarbonate, polystyrene, polyvinylchloride.

The plastics thus filled are used in the field of electronics.

The conductive polymers according to the invention are added in particular as powders to the plastics in a quantity of 1 to 50, preferably 5-40 wt. % in relation to the solid content of the plastic mixture. They are worked into the plastic e.g. by extrusion.

The conductive polymer powders according to the invention can further be used as a filler to give antistatic properties to lacquers for the coating of plastics. Suitable lacquer systems are e.g. acrylate lacquers or polyurethane lacquers.

The conductive polymers according to the invention are added in particular as powders to lacquer systems in a quantity of 1 to 50, preferably 5-40 wt. % in relation to the solid content of the lacquer system.

An optional further use is the use of the product according to the invention as an electrically-conductive electrode in various electronic components.

The polymers according to the invention may also be used as a conductive coating or film, e.g. for antistatic purposes.

The invention is further illustrated but is not intended to be limited by the following examples in which all parts and percentages are by weight unless otherwise specified.

EXAMPLES

Example 1

2.5 g EDT and 2.5 g 2,5-dibromo-EDT were mixed without solvent and heated to 60° C. whilst stirring. When the temperature rose to 77° C. the mixture reacted within 5 minutes to form a blue-black composition with a specific conductivity—measured as a compact powder—of ca 0.01 S/cm.

Example 2

2.5 g EDT and 1.25 g 2,5-dibromo-EDT were mixed without solvent and heated to 80° C. in two hours whilst stirring. When the temperature rose to 87° C., the mixture reacted within 15 min to form a blue-black composition with a specific conductivity—measured as a compact powder—of $4.8 \times 10^{-2}$ S/cm.

Example 3

4.0 g EDT and 1.0 g 2,5-dibromo-EDT were mixed without solvent and heated to 80° C. whilst stirring. At this temperature a trace of N-bromosuccinimide was added. The mixture then reacted vigorously and when the temperature rose to 113° C. formed a blue-black electrically conductive composition. Conductivity as a compact powder: $3 \times 10^{-3}$ S/cm.

Example 4

2.66 g EDT, 1.4 g 2,5-dibromo-EDT and a trace of N-bromosuccinimide were refluxed for 11 hours in 50 ml chloroform whilst stirring. After ca 5 hours a blue-black solid began to separate out. After 11 hours the solid was filtered off, washed with chloroform and dried. Yield: 1.5 g=37% of theoretical. Conductivity as a compact powder: $4.3 \times 10^{-2}$ S/cm.

Example 5

3.98 g EDT, 1.4 g 2,5-dibromo-EDT and a trace of N-bromosuccinimide were refluxed for 14 hours in 50 ml chloroform whilst stirring. The blue-black solid formed was then filtered off, washed with chloroform and dried at 40° C./20 mbar. Yield: 3.41 g=63% of theoretical. Conductivity as a compact powder: $3.7 \times 10^{-4}$ S/cm.

Example 6

5.31 g EDT, 1.4 g 2,5-dibromo-EDT and a trace of N-bromosuccinimide were refluxed for 11 hours in 50 ml chloroform whilst stirring. After ca 5 hours a blue-black solid began to separate out. After 11 h the solid was filtered off, washed with chloroform and dried. Yield: 2.8 g=42% of theoretical. Conductivity as a compact powder: $1.4 \times 10^{-3}$ S/cm.

Example 7

9.1 ml boron fluoride-diethylether complex were metered in 25 min whilst stirring into 2.66 g EDT and 1.4 g 2,5-dibromo-EDT in 50 ml chloroform (exothermic reaction). After stirring over night, the solid precipitate was filtered off, washed with chloroform and dried. Conductivity as a compact powder: $7 \times 10^{-7}$ S/cm.

Example 8

0.2 ml 98% sulfuric acid were added drop-by-drop in 25 min whilst stirring to 2.66 g EDT and 1.4 g 2,5-dibromo-EDT. After stirring over night, the very dark-blue suspension was filtered and the solid was washed with chloroform and dried at 80° C. Conductivity as a compact powder: $3 \times 10^{-7}$ S/cm.

Example 9

0.474 g EDT, 0.5 g 2,5-dibromo-EDT and 0.474 g p-toluenesulfonic acid were dissolved in 85 ml n-butanol and stirred for 10 min at 23° C. The solution was then applied with a doctor blade to a glass sheet in a 60 μm-thick wet-film layer and dried at 140° C. to a conductive grey-black film.

Example 10

0.38 g EDT, 0.4 g 2,5-dibromo-EDT and 5.3 g 85% phosphoric acid were dissolved in 50 ml ethanol. After stirring for 10 min the solution was applied with a doctor blade to a glass sheet in a 60 μm-thick wet-film layer and dried at 150° C. to a conductive blue-grey film, surface resistance $10^6$ Ohm/square.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of electrically conductive poly-3,4-ethylene dioxythiophenes, the process comprising the step of reacting 2,5-dihalogen-3,4-ethylene dioxythiophenes of the Formula (I)

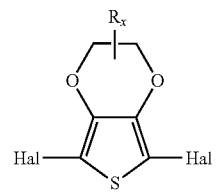

wherein Hal means Cl, Br or I, R=$C_1$- to $C_{18}$-alkyl optionally substituted with OH or $O(CH_2)_nSO_3M$, where n=3 or 4, M=H, Na or K, and x=0 to 4, with
3,4-ethylene dioxythiophene of the Formula (II)

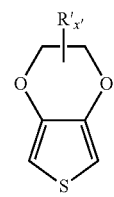

wherein R' and x' have the same meaning as R and x in Formula (I), but are selected independently of each other, in a solvent in the absence of an additional oxidizing agent.

2. The process according to claim 1, wherein 1 to 99 wt. % of compound of the Formula (I) is reacted with 99 to 1 wt. % of compound of the Formula (II).

3. The process according to claim 1, wherein 10 to 50 wt. % of Compound (I) is reacted with 90 to 50 wt. % of Compound (II).

4. The process according to claim 1, wherein Hal means Br.

5. The process according to claim 1, wherein in Compound (I) x=0 and independently of this in Compound (II) x'=0.

6. The process according to claim 1, wherein the reaction takes place in an organic solvent.

7. The process according to claim 1, wherein the reaction is acid-catalysed.

8. The process as claimed in claim 1, wherein the reaction takes place without the presence of acids.

9. The process as claimed in claim 1, wherein the reaction takes place with the presence of an acid.

10. The process as claimed in claim 9, wherein said acid is a non-oxidizing Lewis acid or protonic acid or a mixture thereof.

11. The process as claimed in claim 9, wherein said acid is boron trifluoride, aluminum chloride, zinc chloride, titanium tetrachloride or protonic acid or a mixture thereof.

12. The process as claimed in claim 9, wherein said acid is sulfuric acid or sulfonic acid.

13. The process as claimed in claim 9, wherein said acid is methane sulfonic acid, trifluoromethane sulfonic acid, p-toluene sulfonic acid, polymeric sulfonic acids such as polystyrene sulfonic acid, trifluoroacetic acid, phosphoric acid, polyphosphoric acid or hydrochloric acid or a mixture thereof.

* * * * *